April 4, 1939.   J. R. HYDE   2,153,372
AUTOMATIC HYDRAULIC CLUTCH
Filed July 19, 1938   2 Sheets-Sheet 1

John R. Hyde,
INVENTOR
BY Victor J. Evans & Co.
ATTORNEYS

WITNESS

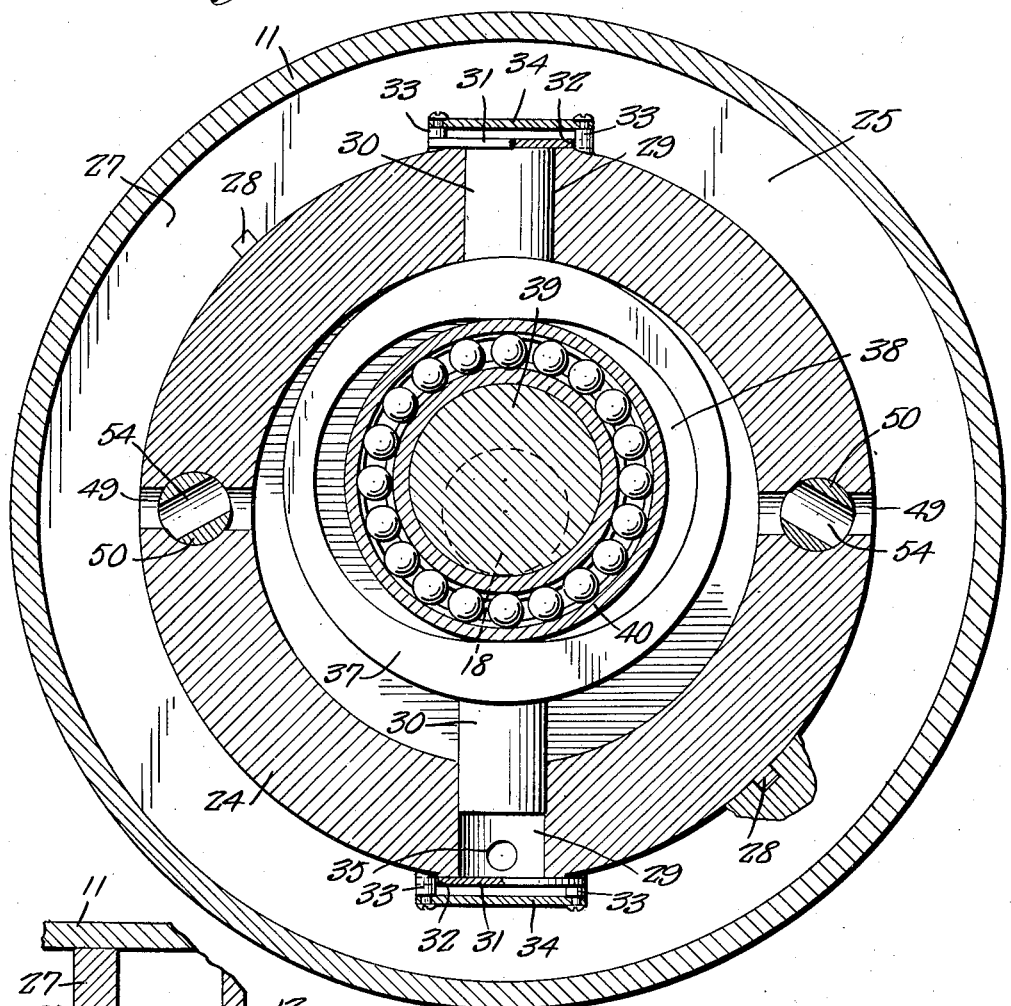

UNITED STATES PATENT OFFICE 2,153,372

AUTOMATIC HYDRAULIC CLUTCH

John R. Hyde, Pittsburgh, Pa., assignor of one-tenth to Walter Bold, Pittsburgh, Pa.

Application July 19, 1938, Serial No. 220,088

4 Claims. (Cl. 192—85)

This invention relates to hydraulic clutches, the prime object being to produce a simple yet practical and efficient structure in a device of this character which is positive and dependable in action and has a variable speed pick-up.

Another object is to produce a hydraulic clutch device which automatically adjusts itself to any drive shaft load and to wear on the brake elements.

A further object is to produce a structure in a device of this character, which requires no inside adjustments and has a positive drive in either direction.

With the foregoing and other objects and advantages to be attained, as will later more fully appear the invention consists in the novel general structure and in the parts and combinations and arrangements of parts thereof as hereinafter described and set forth with particularity in the appended claims, reference being had to the accompanying drawings illustrating a practical adaptation of the invention and in which:

Figure 2 is a cross section; and,

Figure 3 is a fragmentary view illustrating a detail of the by-pass valve and correlated controlling means therefor.

Figure 1:
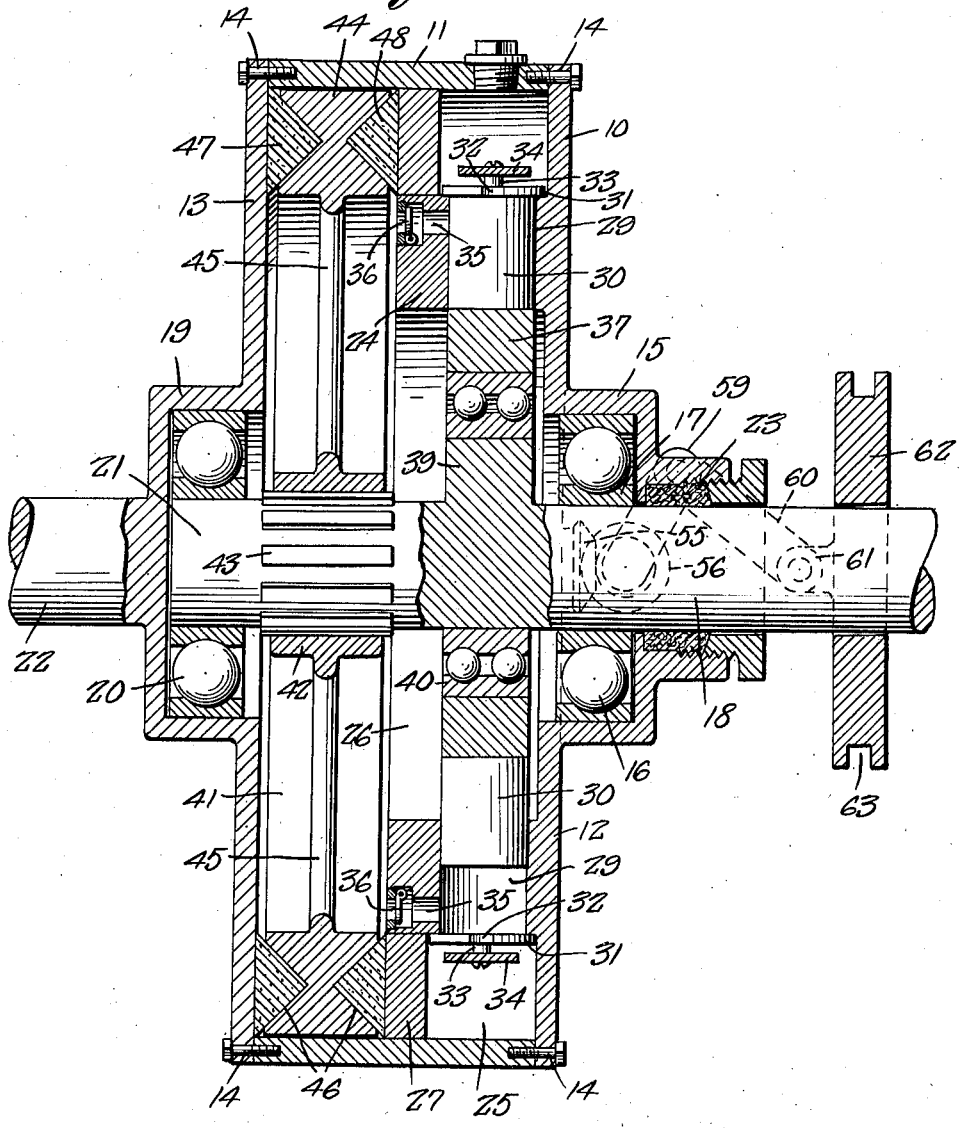
Figure 1 is a longitudinal sectional view of the assembled device.

Referring now to the drawings, the numeral 10 designates generally a hollow cylindrical main body, which, as shown, includes a cylindrical ring member 11 and opposite end walls 12 and 13 which are bolted marginally to the ring member 11, as at 14, with leak-tight effect and sufficient strength to withstand the fluid pressure built up within the cylindrical body during the operation of the device as will later more fully appear.

As shown, the end wall 12 of the cylindrical body 10 has an outwardly offset, central, cylindrical portion 15 in which is mounted a conventional ball bearing 16, the inner race member 17 of which supports a driving shaft 18, the opposite wall 13 of the cylindrical body 10 having a similar outwardly offset central portion 19 in which another ball bearing 20 is provided for the inner end portion 21 of said driving shaft 18. For purposes of a practical illustration of the invention the central offset portion 19 of the end wall 13 of said cylindrical body 10 is provided with an axial extension 22 constituting a driven shaft, while to prevent leakage of the fluid in the cylindrical body 10 about the driving shaft 18, the central offset portion 15 of the wall 12 is provided with a suitable packing gland 23.

Integral with the end wall 12 of the cylindrical body 10 is a relatively thick annular inner wall 24 which is spaced concentrically from the cylindrical wall 11 to provide an annular compression chamber 25 therebetween, the circular central space within the wall 24 constituting a cam clearance chamber 26 and also being a part of the main liquid reservoir of the device.

One end wall of the annular compression chamber 25 is fixed, it comprising the adjacent portion of the end wall 12 between the cylindrical wall 11 and said annular inner wall 24, while the opposite end wall of said chamber is movable, in that it comprises an annular member 27 hereinafter described more particularly as a compression ring, said ring 27 being keyed or splined, as at 28, so as to be movable longitudinally on the circumference of the wall 24 but being thereby held against independent rotative movement. In this connection, it is here noted that the ring 27 is fitted closely to the circumferential face of the annular wall 24 and also to the inner face of the cylindrical outer wall 11 of the main body 10 so as to effectively retain the liquid under pressure within the annular chamber 25, as will later more fully appear, yet permitting ready longitudinal movement of the ring under pressure.

At diametrically opposite points the annular inner wall 24 is provided with opposed radial bores 29 which would ordinarily establish communication between the annular compression chamber 25 and the inner cam clearance chamber 26, but said bores have pistons 30 fitted therein which prevent such direct communication through said bores. At the outer ends of the bores 29, outwardly opening check valves 31 are provided, said valves, as shown, being of a plate type having marginally recessed portions 32 slidably engaging guide studs 33 provided therefor on the adjacent circumferential portion of the annular wall 24. To limit the outward movement of the valve plates 31, spaced stop bars or plates 34 are provided on the outer ends of the studs 33.

In the retracted positions of the pistons 30, communication is established between the bores 29 and the main reservoir or chamber of the cylindrical body 10 through ports 35 provided therefor in the annular inner wall 24, said ports being provided with check valves 36 opening in the direction towards the bores 29. By this provision the liquid in the main reservoir is drawn into the bores 29 by the suction created in the bores when the pistons are retracted and the discharge check valves 31 are closed, and the liquid thus drawn into the bores 29 being forced out of the bores and into the annular compression chamber 25 upon the outward compression strokes of the pistons.

As shown, the two diametrically opposed pistons 30 are securely attached to or formed as an integral part of a yoke 37, which, circumferentially, is circular, but the interior opening 38 thereof is transversely elongated or substantially elliptical. Cooperating with this yoke 37 is an eccentric circular cam 39 which is fixed on or formed integrally with the driving shaft 18, there being a suitable anti-friction bearing 40 interposed between the yoke and the cam. This anti-friction bearing, as shown, is of a double ball race type including an outer ring which is slidably fitted diametrically to the narrower dimension of the transversely elongated opening 38 of the yoke, while the inner ring of the bearing is fitted snugly to the circumference of the cam 39. The set of the cam 39 is such that one of the pistons 30 is at the extreme end of its compression stroke when the other piston is at the limit of its suction stroke, and it being obvious that said pistons are reciprocated in their respective bores 39 during rotation of the driving shaft 18.

Located within the main reservoir of the cylindrical body 10 between the outer wall 13 and the annular inner wall 24 and compression ring 27 on said annular wall is a circular clutch element 41, the hub portion 42 of which is splined on the driving shaft 18, as at 43, so as to rotate with the shaft but being permitted endwise movement thereon. The peripheral ring portion 44 of the clutch element 41 is connected to the hub portion 42 by a suitable arrangement of spokes or a web portion provided with a multiplicity of openings therein, as at 45. As shown, the peripheral ring portion 44 is provided in its opposite side faces with annular grooves 46 having inclined side walls for the reception of a counterpart annular gripping shoe 47 which is secured to the inner face of the outer wall 13 on the one side and on the other side a similar shoe 48 secured to the adjacent face of the compression ring 27. Said annular shoes 47 and 48 are respectively fastened to the wall 13 and the compression ring 27 by any suitable means and they may be obviously made of metal or any rubber or fibrous material suitable for braking purposes and which will withstand the action of the oil or other liquid employed in the device.

With the clutch element 41 splined to rotate with the driving shaft 18 but permitted to move independently endwise on the shaft, and with the annularly grooved peripheral ring portion 44 interposed between the opposed brake shoes 47 and 48, the shaft 18 is free to continue rotation until sufficient fluid pressure is built up in the annular chamber 25 to forcibly move the compression ring 27 towards the outer wall 13 and thereby effectively clamp the peripheral ring portion 44 of the clutch element 41 between the opposed brake shoes 47 and 48, the endwise movement of the element 41 on the shaft 18 compensating amply for the accomplishment of this braking effect.

To provide for variably building up the fluid pressure in the annular chamber 25, by-pass ports 49 are provided in the annular wall 24 diametrically opposite to each other and at right angles to the alignment of the bores 29 for establishing communication directly between the annular chamber 25 and the cam clearance chamber 26, the particular location of said ports 49 and the relative diameters of the chamber 26 and yoke 37 which carries the pistons 30 being such that there is no blocking of the ports 49 except by valve elements 50 which now will be described.

As shown more clearly in Figure 3, the ports 49 are intersected by tapered bores which are formed in the annular wall portions 24 through the outer wall 12 and the valves 50 which are correspondingly tapered are inserted externally into said intersecting bores and yieldably held in place by springs 51 which are sleeved about axial stem extensions 52 of the valves and projected through reduced cylindrical portions of the tapered bore, said spring elements being interposed between the adjacent end face of the annular inner wall 24 and a cross pin 53 on the stem portion 52 so as to constantly urge the valve 50 inwardly, yet permitting its rotation in said tapered bore.

The valve member 50 is provided with a transverse port 54 which is of substantially the same diameter as the port 49 so that when the ports 49 and 54 are in full registration there is an unrestricted passageway therethrough but when the valve 50 is rotated to move its port 54 out of such full registration with the port 49 the passageway is variably restricted. By this provision, when the pistons 30 are reciprocated in the bores 29 and the ports 54 of the valves 50 are in full registration with the ports 49, a by-pass of sufficient area between the compression chamber 25 and cam clearance chamber 26 is afforded for the free passage of the liquid pumped into the chamber 25 back into the main reservoir. Thus the shaft 18 is free to continue rotating independently of the cylindrical body 10. However, when the valves 50 are rotated to reduce the area of the by-pass, fluid pressure is accordingly built up in the chamber 25 causing the compression ring 27 to move towards the outer wall 13 and press the annular brake shoe 48 against the peripheral ring portion 44 of the clutch member 41 with braking effect to retard the rotative movement of the element 41. Upon movement of the valves 50 to the position where the ports 49 are completely closed, the pressure in the annular chamber 25 becomes such that the combined resistance thereof to the further operation of the pistons and the clamping of the peripheral ring portion 44 between the annular brake shoes 47 and 48 under the pressure of the ring member 27 effectively stops the rotation of the shaft 18 independently of the cylindrical body 10.

With the clutch elements thus engaged, it is obvious that the cylindrical body 10, if otherwise free to rotative movement, rotates with the driving shaft 18 and in turn rotates the driven shaft 22 attached to the body 10, as illustrated, or, obviously, the rotation of the body 10 may be imparted to any other driven element in connection with which it may be installed. However, if the cylindrical body 10 is supported or fastened against rotation, with the clutch elements engaged as above described, a substantial braking effect is produced and the driving shaft 18 is held against rotation. It is thus seen that the device may be utilized for transmitting rotary movement from one element to another or for stopping or retarding the movement of a rotary machine element such as a shaft or the like with equal facility.

Any suitable means for operating and controlling the by-pass valves 50, either automatically or by manual manipulation, may be provided. As illustrated in Figures 1 and 3 of the drawings, provision for this purpose may include a beveled gear 55 fixed on the outer end of the valve member 50 in mesh with a similar gear 56 which is fixed on a crank 57 journaled in a bearing bracket 58 located on the outer side of the end wall 12 of the rotatable body 10. The crank 57 includes an arm 59 to the outer end of which is pivotally attached a link 60 which in turn is pivotally attached to a lug 61 on an actuating element 62, which latter is sleeved freely on the drive shaft 18 so as to be moved longitudinally of the shaft and whereby the shaft is rotatable independently of said member 62. By this arrangement the valve member 50 is rotated when the element 62 is moved endwise in either direction on the shaft 18 thereby opening or closing the ports 49 either fully or partially, according to the distance the element 62 is moved and the direction of movement, it being understood that both of the valves 50 are similarly though separately connected to the element 62 and thereby simultaneously operated.

Any suitable means (not shown) may be provided for the automatic or manual actuation of the element 62, said element 62 being in the form of a circular disc having a central opening and an annular circumferential groove 63 for the cooperative engagement of a conventional shifting element having the usual bifurcated portions with diametrically opposed lugs or rollers which may be disposed within the annular groove 63 whereby to effect the longitudinal movement of the element 62 on the shaft 18 and yet permit rotation of said element 62 independently of said shifting means. In this connection it is noted that the shifting means may be manipulated manually by means of a hand lever or pedal device or automatically through the agency of a centrifugal governor, for example, and as such provision is quite obvious, it is deemed unnecessary to illustrate the same in detail herein. Suffice it to say that whether the valve members 50 are opened and closed by manual manipulation or automatically, the fluid pressure may be built up in the annular compression chamber 25 with variable speed, at will, and it may be here also noted that the particular arrangement of the compression ring 27 and the annular brake elements 47 and 48 in correlation to the peripheral ring portion 44 of the clutch member 41 is such that the wear on the brake elements and contact faces of the clutch element is automatically taken up because of the relative endwise movement permitted the clutch member 41 and the compression ring 27. There is a further advantage in the operation of the device of the present invention in that there are no necessary inside adjustments other than the valve members 50 and these adjustments are, as hereinabove described, effected externally of the device. So, too, the clutching action is positive and is equally effective when the driving shaft 18 is rotated in ether direction.

Obviously, the structure admits of considerable modification within the spirit and scope of the invention as defined by the appended claims. The invention, therefore, is not limited to the specific construction and arrangement shown in the accompanying drawings.

What is claimed is:

1. A hydraulic clutch device comprising, a hollow cylindrical body, a driving shaft entered axially and rotatable in said body, the body having an annular compression chamber adjacent one end thereof, said chamber being defined by the adjacent end wall portion and peripheral wall portion of the body, together with an annular inner wall projecting from the adjacent end wall, the inner end wall of said chamber being defined by a compression ring movable annularly with the cylindrical body between the circumference of the annular inner wall and inner face of the cylindrical outer wall but movable independently endwise relative to said body wall portions, a clutch element located in the cylindrical body between the opposite end wall and the annular inner wall thereof, said clutch member having a hub portion splined on said drive shaft whereby the element is rotatable with said shaft but is movable endwise independently of the shaft, said clutch element having a peripheral ring portion circumferentially adjacent the cylindrical wall of said body, brake shoes interposed between the adjacent end wall of the body and said peripheral ring portion of the clutch element and between said peripheral portion and said compression ring, variable by-pass means between said annular compression chamber and the space within said annular inner wall, means for pumping liquid from the main interior space of the cylindrical body into said compression chamber, and a cam element on said drive shaft for actuating said pumping means.

2. A hydraulic clutch device comprising, a hollow cylindrical body, a driving shaft entered axially and rotatable in said body, the body having an annular compression chamber adjacent one end thereof, said chamber being defined by the adjacent end wall portion and peripheral wall portion of the body, together with an annular inner wall projecting from the adjacent end wall, the inner end wall of said chamber being defined by a compression ring movable annularly with the cylindrical body between the circumference of the annular inner wall and inner face of the cylindrical outer wall but movable independently endwise relative to said body wall portions, a clutch element located in the cylindrical body between the opposite end wall and the annular inner wall thereof, said clutch member having a hub portion splined on said drive shaft whereby the element is rotatable with said shaft but is movable endwise independently of the shaft, said clutch element having a peripheral ring portion circumferentially adjacent the cylindrical wall of said body, brake shoes interposed between the adjacent end wall of the body and said peripheral ring portion of the clutch element and between said peripheral portion and said compression ring, variable by-pass means between said annular compression chamber and the space within said annular inner wall, means for pumping liquid from the main interior space of the cylindrical body into said compression chamber, a cam element on said drive shaft for actuating said pumping means, and external means for operating and controlling said by-pass means.

3. A hydraulic clutch device comprising, a hollow cylindrical body, a driving shaft entered axially and rotatable in said body, said body having an annular compression chamber adjacent its periphery and one end wall thereof, the substantial remainder of the body interior constituting a main reservoir, the inner end wall of said compression chamber comprising a ring member movable rotatably with the body but having independent endwise movement, variable by-pass means between said compression chamber and main reservoir, means for pumping liquid from the main reservoir to said annular compression chamber, said pumping means being actuated from the drive shaft, a clutch element located in the main reservoir of said cylindrical body, said clutch element having a hub portion mounted on the drive shaft to rotate therewith but having independent endwise movement thereon, a ring portion on said clutch element located circumferentially adjacent the cylindrical wall of said body and between the adjacent end wall of the body and said ring member constituting the movable end wall of said annular compression chamber, a brake shoe interposed between said movable ring wall member and the ring portion of said clutch element, and second brake shoe opposed to said first-mentioned brake shoe and interposed between said ring portion of the clutch element and the adjacent end wall of the cylindrical body.

4. A hydraulic clutch device comprising, a hollow cylindrical body, said body having an annular internal wall extending from one outer end wall thereof whereby to provide an annular compression chamber about said annular wall and an inner cam clearance chamber within said annular wall, said clearance chamber communicating openly with the remainder of the interior of the cylindrical body and constituting jointly therewith a main reservoir, a compression ring constituting a movable end wall of the annular compression chamber, said ring being movable rotatably with the cylindrical body but movable endwise independently thereof between the circumference of the annular inner wall and cylindrical outer wall of the body, a clutch element located in the main reservoir portion of the cylindrical body, said clutch element having an annular peripheral portion interposed between the adjacent outer end wall of the cylindrical body and said compression ring, brake shoes interposed between said end wall and said clutch element and between the clutch element and said compression ring, pump means including diametrically opposed pistons working in radial bores provided therefor in said annular inner wall, outwardly opening check valves controlling communication between said bores and the annular compression chamber, said annular wall having ports provided with inwardly opening valves for establishing communication between the main reservoir and said pump bores, a drive shaft entering said cylindrical body axially and rotatable therein, said shaft having a splined connection with said clutch element in the main reservoir whereby said clutch element is rotatable with the shaft but is movable independently longitudinally of the shaft, a cam fixed on said drive shaft in the clearance chamber within said annular inner wall, said cam having an operable connection with the pump pistons whereby to reciprocate the latter during rotation of the drive shaft, and regulatable by-pass means between said annular compression chamber and said inner clearance chamber within said annular inner wall.

JOHN R. HYDE.